United States Patent [19]

Satoh et al.

[11] Patent Number: 5,393,584
[45] Date of Patent: Feb. 28, 1995

[54] MAGNETIC DISC

[75] Inventors: Jun-ichi Satoh; Keiji Koga; Akinori Nishizawa, all of Nagano, Japan

[73] Assignee: TDK Corporation, Tokyo, Japan

[21] Appl. No.: 13,395

[22] Filed: Feb. 4, 1993

[30] Foreign Application Priority Data

Feb. 21, 1992 [JP]  Japan .................. 4-072584

[51] Int. Cl.⁶ .............................................. G11B 5/00
[52] U.S. Cl. .................... 428/64; 428/156; 428/323; 428/336; 428/694 B; 428/694 BR; 428/900; 427/130
[58] Field of Search .................. 428/64, 65, 323, 336, 428/694 B, 694 BR, 900, 156; 427/130, 599

[56] References Cited

U.S. PATENT DOCUMENTS

| | | | |
|---|---|---|---|
| 4,551,355 | 4/1985 | Ericson et al. | 427/130 |
| 4,557,947 | 12/1985 | Deimling et al. | 427/130 |
| 4,587,139 | 5/1986 | Hagan et al. | 427/130 |
| 5,166,006 | 11/1992 | Lal et al. | 428/612 |

FOREIGN PATENT DOCUMENTS 58-114763  9/1983  Japan .

*Primary Examiner*—Stevan A. Resan
*Attorney, Agent, or Firm*—Oblon, Spivak, McClelland, Maier & Neustadt

[57] ABSTRACT

When a magnetic disc is fabricated by forming on a rigid substrate a film of a magnetic coating material containing magnetic fine particles and a binder, and orienting and curing the film, the film is formed while a magnetic field is applied thereto, said magnetic field being larger in the strength on the inner side than on the outer side of said rigid substrate, thereby making it possible to form a magnetic layer that is uniform in thickness, or is thicker on the inner side and thinner on the outer side. This makes it possible to provide a coated type of magnetic disc in which there is a limited difference in the reproduction output and overwriting properties between the inner and outer sites.

6 Claims, 3 Drawing Sheets

MAGNETIC DISC

BACKGROUND OF THE INVENTION

1. TECHNICAL FIELD

The present invention relates to a hard disc type of magnetic disk and its fabrication process.

2. BACKGROUND TECHNIQUE

For magnetic disc drive equipment used with computers, etc., hard types of magnetic discs including a magnetic layer on a rigid substrate have been used and, in recent years, these magnetic discs have been rapidly increased in capacity and decreased in size. These magnetic discs are usually fabricated by the spin-coating of a magnetic coating material, followed by orientation, curing, and so on.

A coated type of magnetic disc thus fabricated by the spin-coating technique has a film that is made thinner on the inner side and thicker on the outer side by centrifugal force.

With a magnetically recorded magnetic disk, on the other hand, recording and reproduction are done at the same frequency. Hence, there is a difference in the relative speed with respect to a magnetic head between the inner and outer sites of the disc, so that the disc can be shorter in recording wavelength and higher in recording density on the inner site than on the outer site. Thus, there arises a problem that the reproduction output becomes low on the inner site and high on the outer site, and this is even true of a magnetic disc having a magnetic film of uniform thickness. Accordingly, such an output difference becomes much larger in the case of a disc that is thinner on the inner side and thicker on the outer site, as is the case with the conventional coated type of magnetic disc.

The higher the relative speed, the larger the amount of levitation of a levitation type magnetic head is and, hence, the farther the disc is from the center, the larger the amount of levitation is. For this reason, the farther the disc is from the center, the more unfavorable the overwriting properties are. In addition, the larger the film thickness, the worse the overwriting properties are. Accordingly, a conventional coated type of magnetic disc having a recording layer that increases in thickness as it is far from the center is further unfavorable in view of the overwriting properties of the outer site.

Thus, a problem with a conventional coated type of magnetic disc is that there is a large difference in reproduction output and overwriting properties between the inner and outer sites.

As magnetic disc size decreases from 14 or 8 inches to 5, 3.5, and 2.5 inches, the inner diameter increases relatively; the ratio between the outer and inner diameters increases, and so the difference in centrifugal force on the outer and inner sites of the disc during spin coating increases, with the resulting increase in the film thickness difference. In addition, there is an increase in the ratio of the relative speeds of the head and disc at the time of record reproduction, which gives rise to a further increase in the differences in terms of reproduction output and overwriting properties.

An approach for solving such problems, for instance, is disclosed in JP-B-61-3545 that is directed to a coating method in which the viscosity of a coating material is controlled by gas spraying depending on where the film is located, followed by spinning-out. The use of this coating method makes it possible to increase the thickness of the film on the inner site by pre-increasing the viscosity of the inner-side film, but film thickness control is difficult at a film thickness of 0.5 mm or below, resulting in a lowering of the squareness ratio of the inner site of the film.

Such problems may also be solved by forming a thicker magnetic layer and then polishing the outer site of the layer to a smaller thickness. In this case, however, the polishing makes film thickness uneven or causes damage to the film at a film thickness of 0.3 $\mu$m or below, causing modulation to be increased at the time of recording and reproduction and so often giving rise to errors.

DISCLOSURE OF THE INVENTION

A primary object of the invention is to provide a process for making a magnetic disc including a magnetic layer that is uniform in thickness on the inner and outer sites or, preferably, is thicker on the inner site and thinner on the outer site, and a magnetic disc.

Such an object is achieved by the following inventions (1) through (12).

(1) A magnetic disc including on a rigid substrate a magnetic layer obtained by forming a film of a coating material containing magnetic fine particles and a binder, and orienting and curing the film, wherein:
   said film is formed while a magnetic field is applied thereto, said magnetic field being larger in the strength on the inner side than on the outer side of said rigid substrate.

(2) A magnetic disc according to the above (1), wherein the value obtained by dividing the magnetic field strength on said outer side by the magnetic field strength on said inner side is 1.1 or more.

(3) A magnetic disc according to the above (1), wherein said film is formed by spin coating.

(4) A magnetic disc according to the above (1), wherein after said curing, polishing is carried out.

(5) A magnetic disc according to the above (2), wherein said magnetic layer is larger in the thickness on said inner side than on said outer side.

(6) A magnetic disc according to the above (4), wherein a difference in thickness between the outer and inner sites of said magnetic layers is 1% to 40% of the film thickness on the inner site.

(7) A magnetic disc according to the above (5), wherein said magnetic layer is 0.6 $\mu$m or below in thickness.

(8) A magnetic disc according to the above (7), wherein said magnetic layer has a surface roughness Rmax of 0.1 $\mu$m or below.

(9) A magnetic disc including on a rigid substrate a magnetic layer obtained by forming a film of a coating material containing magnetic fine particles and a binder and orienting and curing the film, wherein:
   said magnetic layer is larger in thickness on the inner side than on the outer side.

(10) A magnetic disc according to the above (9), wherein a difference in thickness between the outer and inner sites of said magnetic layers is 1% to 40% of the film thickness on the inner site.

(11) A magnetic disc according to the above (9), wherein said magnetic layer is 0.6 $\mu$m or below in thickness.

(12) A magnetic disc according to the above (11), wherein said magnetic layer has a surface roughness Rmax of 0.1 $\mu$m or below.

ACTION

In the process for fabricating a magnetic disc according to the invention, a magnetic coating material is coated on a rotating disc to form a film, while a magnetic field is being applied thereto. At this time, the magnetic field that is larger in strength on the inner site than on the outer site of the disc is applied to the film, whereby the magnetic force is applied inwardly to the film to move the magnetic coating material inwardly. As a result, it is possible to form a magnetic layer that is thicker on the inner site and is thinner on the outer site.

In such a magnetic disc, differences in reproduction output and overwriting properties between the inner and outer sites are reduced.

In addition, it is possible to form a magnetic layer excellent in surface smoothness by the applied magnetic field and to prevent the drying of the coating material until just before orientation, thereby achieving a good-enough orientation of the magnetic fine particles and so obtaining a high squareness ratio. It is thus possible to obtain a magnetic disc that is unlikely to give rise to errors, and enables the quantity of levitation of an associated magnetic head to be reduced.

ILLUSTRATIVE CONSTRUCTION

In the ensuing description, the illustrative construction of the invention will be explained at great length.

Figure 1:
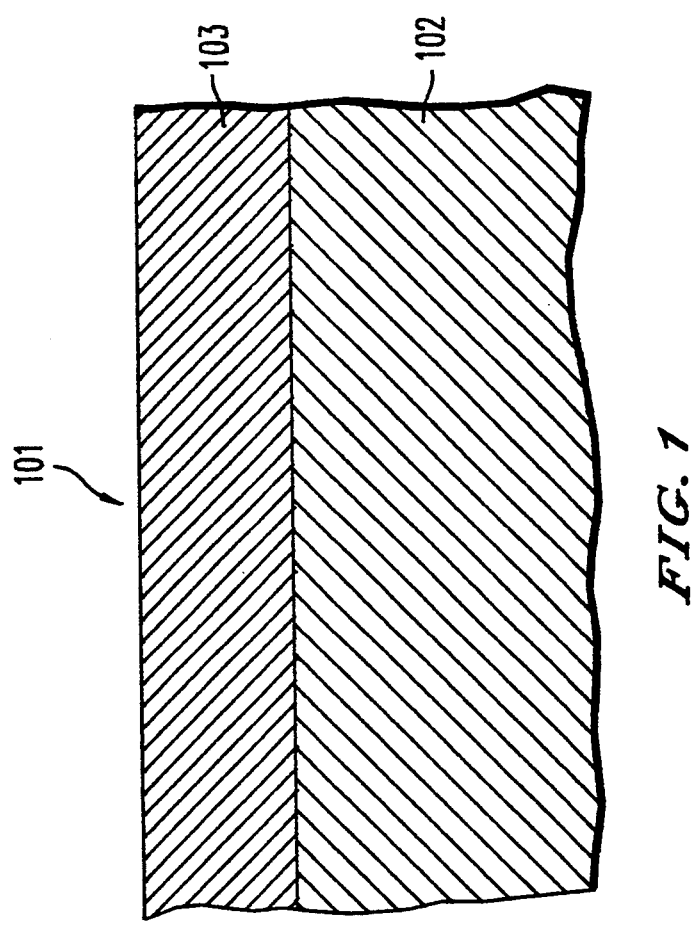
FIG. 1 is a partial section showing a preferable embodiment of the magnetic disc according to the invention.

Illustrated in FIG. 1 is a preferable embodiment of the magnetic disc according to the invention.

Referring now to FIG. 1, a magnetic disc 101 includes a coated type of magnetic layer 103 on a rigid substrate 102. The invention is directed to both a single-side recording type of magnetic disc having a magnetic layer 103 on only one side of the rigid substrate 102 and a double-side recording type of magnetic disc including magnetic layers 103 on both sides of the rigid substrate 102.

A disc form of rigid substrate 102 used in the invention, for instance, may be made of metal such as aluminum or an aluminum alloy, or various non-magnetic materials such as glass, ceramics or engineering plastics. Among these materials, preference is given to using aluminum, an aluminum alloy or other like metal, because they are excellent in mechanical rigidity, processability, and so on. While rigid substrate size may be chosen depending on the purpose, the substrate may usually be about 0.5 to 1.9 mm in thickness and about 40 to 130 mm in diameter. The substrate has also an Rmax of about 0.005 to 0.070 $\mu$m.

The magnetic layer 103 is formed by the coating of a magnetic coating material containing magnetic fine particles. No particular limitation is imposed on the magnetic fine particles; magnetic powders of various oxides may be used. However, fine particles of ferromagnetic metals or fine particles of hexagonal oxides are preferable. If the fine particles of ferromagnetic metals or hexagonal oxides are used, a high recording density and a high recording/reproducing sensitivity are then obtained. No particular restriction is placed on the fine particles of ferromagnetic metals or hexagonal oxides used, but it is preferable to use the material that achieves such magnetic properties as mentioned above.

For the fine particles of ferromagnetic metals, Fe, Co, and Ni may be used by themselves or in the form of their alloys. These metals or alloys may additionally contain Cr, Mn, Co and Ni, and may further contain Zn, Cu, Zr, Al, Ti, Bi, Ag, Pt, and so on. To add to this, these metals may contain small amounts of non-metal elements such as B, C, Si, P and N, and may be partially nitrided, like $Fe_4N$.

The fine particles of ferromagnetic metals may include oxide films on their surfaces so as to improve their corrosion resistance, weather resistance, and so on. For such oxides, use is preferably made of oxides of the metals forming the fine particles of ferromagnetic metals or various ceramics such as $Al_2O_3$.

The fine particles of ferromagnetic metals are not particularly critical in terms of morphology, but it is preferable to use them in an acicular form, because it is then possible to make use of form magnetic anisotropy. The sizes of the fine particles of ferromagnetic metals may be chosen depending on the construction of the desired magnetic layer, but it is usually preferable to use the fine particles having a major diameter of about 0.15 to 0.30 $\mu$m and an acicular ratio of about 6 to 10. Note that when the fine particles of ferromagnetic metals are used, they may be produced by various known methods including the reduction of $\alpha$-FeOOH (Goethite), or may be commercially available particles.

As the fine particles of hexagonal oxides, magnetic fine particles such as those of barium ferrite and strontium ferrite may be used. In this case, the sizes of the fine particles of hexagonal oxides may be chosen depending on the construction of the target magnetic layer, but it is preferable to use hexagonal oxide particles having a mean particle diameter of at most 0.15 $\mu$m, particularly about 0.02 to 0.10 $\mu$m and a plate ratio of at least 2, particularly about 3 to 10. It is to be noted that the term "mean particle diameter" refers to an average of diameter measurements of, e.g., about 50 hexagonal barium ferrite particles, found by observation of electron micrographs thereof. Here, too, the term "plate ratio" means a value given by dividing mean particle diameter by mean thickness.

Examples of the barium ferrite are a hexagonal barium ferrite such as $BaFe_{12}O_{19}$, which may be partly replaced by at least one member selected from Ca, Sr, Pb, Co, Ni, Ti, Cr, Zn, In, Mn, Cu, Ge, Nb, Zr, Sn and other metals. Examples of strontium ferrite may be a hexagonal strontium ferrite, $SrFe_{12}O_{19}$, which may again be substituted, as mentioned above. In this case, the hexagonal ferrite may have been modified on the surface by spinel ferrite for the purpose of increasing the quantity of its magnetization and its temperature properties. In addition, these particles may be coated with an oxide or organic compound with a view to improving their weather resistance and dispersibility.

The barium ferrites, etc., may be produced by any desired known technique such as ceramic, co-precipitation sintering, hydrothermal synthesis, flux, glass crystallization, alkoxide, plasma jet and other techniques.

The coating material used for magnetic layer formation may be prepared by kneading the magnetic fine particles mentioned above with a binder and a solvent.

The binder used is not particularly critical; thermosetting resin, a reactive type of resin, radiation-curable resin and other resin may be chosen depending on the purpose, but it is preferable to use thermosetting or radiation-curable resin because of the need of obtaining a good-enough film strength in a thin layer form and thereby achieving high durability.

Suitable examples of the thermosetting resin are mixtures of a polycondensation type of resins such as phenolic resin, epoxy resin, viny copolymer resin, a polyurethane-cured type resin, urea resin, butyral resin, formal resin, melamine resin, alkyd resin, silicone resin, an acrylic type of reactive resin, polyamide resin, epoxy-polyamide resin, saturated polyester resin and urea-formaldehyde resin or high-molecular-weight polyester resins with isocynate prepolymers; mixtures of the above polycondensation type of resins with cross-linking agents like isocyanate compounds such as mixtures of polyester polyols with polyisocyanates, mixtures of low-molecular-weight glycols, high-molecular-weigth diols and triphenylmethane isocynates; mixtures of vinyl copolymer resins with crosslinking agents; mixtures of cellulosic resins such as nitrocellulose and cellulose acetate butyrate with crosslinking agents; synthetic rubber such as butadiene-acrylonitrile with cross-linking agents, and mixtures of these mixtures.

Particular preference is given to a mixture of epoxy resin with phenolic resin, a mixture of epoxy resin, polyvinyl methyl ether and methylol phenol ether that is disclosed in U.S. Pat. No. 3,058,844, a mixture of a bisphenol A type epoxy resin and an acrylic or methacrylic ester polymer that is set forth in JP-A-49-131101, and the like.

Illustrative examples of the radiation-curable compound are thermoplastic resins in the molecules of which there are introduced a group that is crosslinked or polymerized by exposure to radiations such as an acrylic double bond (e.g., acrylic acid or methacrylic acid having a radically polymerizable, unsaturated double bond, or their ester compounds), an allyl double bond (e.g., diallyl phthalate), or an unsaturated bond (e.g., maleic acid or a maleic acid derivative). Besides, any other compound having an unsaturated double bond crosslinked and polymerized by exposure to radiations may be used.

Preferable examples of the resin used as the radiation-curable binder are saturated or unsaturated polyester resin, polyurethane resin, vinyl chloride resin, polyvinyl alcohol resin, polyvinyl butyral resin, epoxy resin, phenoxy resin, cellulosic resin, an acrylonitrile-butadiene copolymer, polybutadiene, and so on, all containing the above unsaturated double bonds in their molecular chains, terminals or side chains.

Preferable examples of the radiation-curable compound used as an oligomer or monomer in the invention are mono- or poly-functional triazine, polyhydric alcohol, pentaerythritol, ester and urethane types of acrylates and methacrylates.

No particular limitation is imposed on the content of the binder in the magnetic coating material, but the binder is preferably used in an amount of about 10 to 50 parts by weight per 100 parts by weight of the magnetic fine particles.

The solvent used is not particularly critical; a ketone such as cyclohexanone or isophorone, an alcohol such as isopropyl alcohol or butyl alcohol, a Cellosolve solvent such as ethyl cellosolve or Cellosolve acetate, an aromatic solvent such as toluene, and so on, may be chosen depending on the purpose.

The content of the solvent in the magnetic coating material is not particularly critical; the solvent may be used in an amount of about 400 to 700 parts by weight per 100 parts by weight of the magnetic fine particles. The magnetic coating material, if required, may contain an abrasive such as $\alpha$-$Al_2O_3$, a lubricant such as silicone oil, and other additives.

Such a coating material is coated on the surface of the rigid substrate that has been polished on the surface. In this case, the rigid substrate may have been treated on the surface by an anodized film such as anodized aluminum, an oxidized film of chromic acid, etc., an electrolessly plated film of Ni—P—Cu, etc., a coupling agent, a curable resin, and so on.

No special restriction is placed on how to coat the magnetic coating material, but it is preferable to rely on spin coating, because it makes uniform coating easy and achieves the effect of the invention effectively. While the coating material is coated by spin coating to form a film on the substrate, a stronger magnetic field is applied to an inner site of the substrate that remains rotated. This magnetic field then permits magnetic force to act on the film in the inward direction, enabling the film to move inwardly.

The invention, which places no particular limitation on the magnetic field-application device used, will now be explained with reference to FIG. 2 that shows a preferable example thereof.

A magnetic field is applied to a substrate 102 on which the magnetic coating material is coated. The direction of the magnetic field is usually vertical to the substrate 102 but, in some cases, may be at slight angles thereto.

In this case, it is desired that the magnetic field strength be 100 to 3000 G, especially 200 to 3000 G, as measured in the magnetic coating material in the innermost site of the substrate. Too low strength makes the leveling effect insufficient, because no force enough to move the film is obtained. Too high strength makes the surface properties of the film worse.

In this case, the strength of the applied magnetic field reaches a maximum in the magnetic coating material at the innermost site of the substrate 102; it increases continuously or incrementally from the outermost to innermost site. In order to apply such a magnetic field, a pair of rod-like magnets 203 and 204 with the major surface magnetized is located with the substrate 102 interposed between them and with the different poles opposed to each other, as illustrated.

Figure 2:
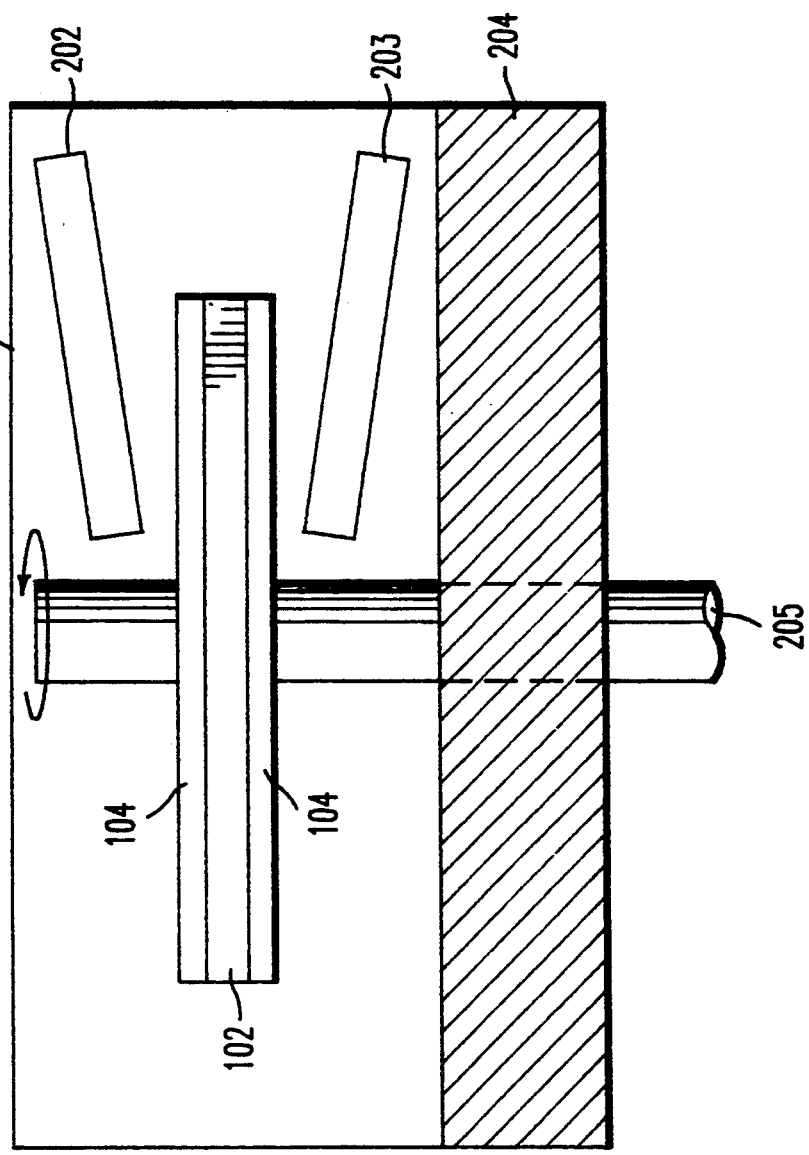
FIG. 2 is a front view that is an illustration of how to fabricate the magnetic disc according to the invention.
Figure 3:
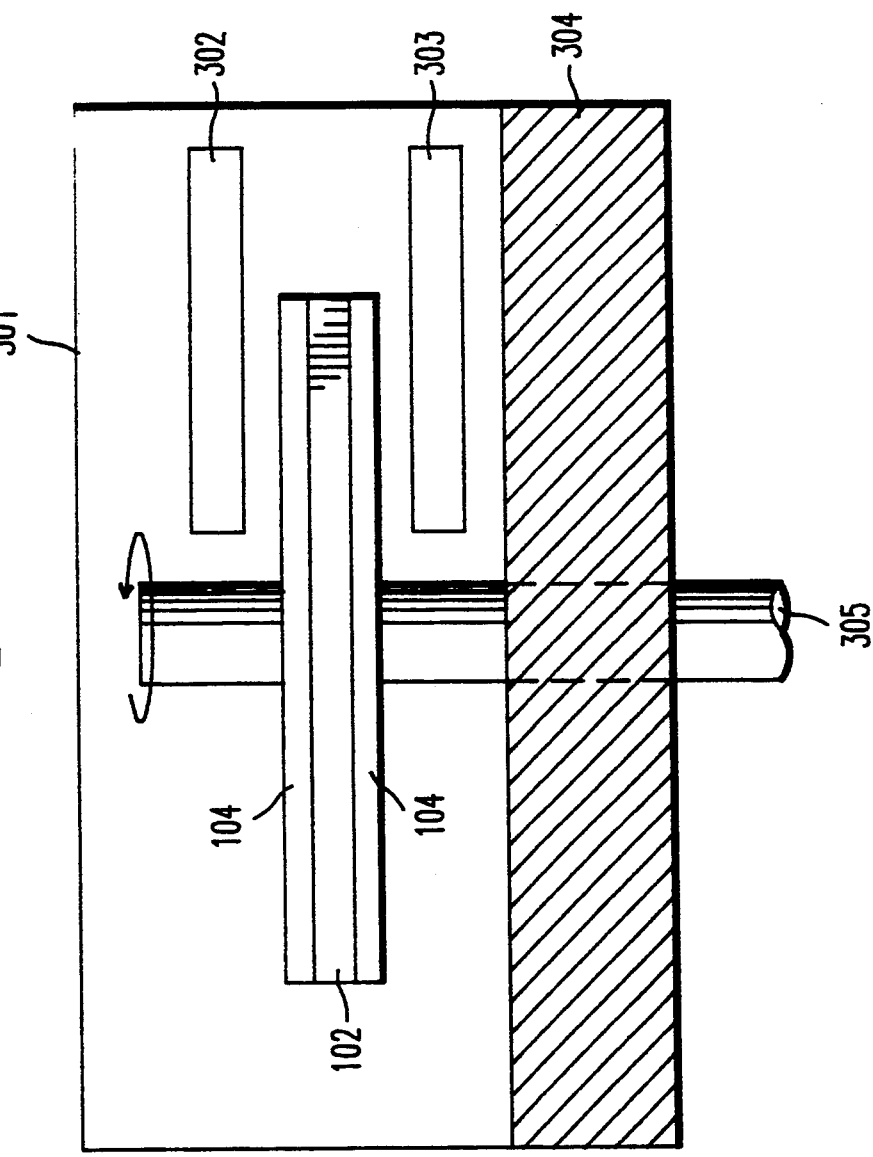
FIG. 3 is a front view that illustrates a comparative process in contrast to the process for fabricating the magnetic disc according to the invention.

In order to make the magnetic field strength of the inner side stronger than that of the outer side, a pair of magnets 202 and 203, each having a uniform magnetic flux, may be located in such a way that the space between them is narrower on the inner side than on the outer side, thereby increasing the quantity of magnetization on the inner side, as illustrated in FIG. 2. Alternatively, the increase in the quantity of magnetization is achieved by an equidistant, parallel arrangement of a rod-form of magnets, each comprising segment magnets having varying magnetic field strengths. Besides, magnetic flux regulation may be achieved by locating a soft magnetic material on the surfaces of magnets. In addition, these procedures may be used in combination.

In the invention, either permanent magnets or electromagnets may be used. The maximum energy products (BH)max, size, etc., of the magnets used may be appropriately chosen depending on the applied magnetic field strengths, distances between the substrate and the magnets, etc. Usually, each magnet has a (BH)max of about 16 to 30 MGOe, and is spaced about 5 to 20-mm away from the substrate, with the pole being about 10×65 mm in size. It is preferable that the value obtained by dividing the magnetic field strength on the outer side by the magnetic field strength on the inner side lies at 1.1 or more, desirously 1.5 or more, more desirously 2 or more. It is also noted that the magnetic field strength on the outermost site may be reduced to zero.

The invention is not limited to using one pair of these opposite magnets 203 and 204; they may be used in some, e.g., about 2–6, pairs. It is noted that the procedure of application of the magnetic field is not limited to the above one; this may be achieved by various procedures. For instance, the magnetic filed may be applied vertically to the substrate by poles arranged on only one side of the substrate.

By the application of such a magnetic field, it is possible to form a magnetic film excellent in surface smoothness and to prevent the drying of the magnetic coating material just until just before orientation as well, thereby achieving a good-enough orientation of the magnetic fine particles and hence obtaining a high squareness ratio.

Film formation is rudimentarily achieved by coating at a relatively low revolution per minute (up to 2000 rpm, particularly about 200 to 2000 rpm for about 1 second to 1 minute), or severing at a high revolution per minute (at least 1000 rpm, particularly about 1000 to 10000 rpm for about 1 second to 3 minutes), followed by an orientation treatment. In this case, leveling that is carried out at a low revolution per minute (about 200 to 3000 rpm for about 1 second to 5 minutes) so as to smoothen the film and other steps may be introduced in the process, if required, after film formation and before orientation. While the film is being formed, it is not always required to keep the applied magnetic field constant; the magnetic field may be applied to the substrate during only some of the process of film formation, or the magnetic field distribution may be varied anytime during the process of film formation. At the leveling step, it is preferable to provide a continued application of the magnetic field, thereby reducing the influence of centrifugal force. In some cases, however, that step may be carried out with the application of a uniform magnetic filed or in the absence of any magnetic field.

In the invention, the magnetic field may be applied to the film during film formation or leveling in an air atmosphere containing dissolved solvent vapor. The solvent used is not particularly critical; one or more of the solvents usable for coating material preparation be used. In this case, the atmospheric temperature may be 20° to 50° C. This enables the drying of the magnetic film to be prevented until just before orientation and hence the magnetic fine particles to be sufficiently oriented, thereby forming a magnetic layer having a high coercive force and a high squareness ratio S.

Following the application of the magnetic coating material, film formation and leveling, the magnetic fine particles are oriented. It is preferable that the coating material is oriented with the easy-to-orient axis being directed to the peripheral direction of the disk. In order to achieve such orientation, a pair of magnets is preferably arranged with the same poles opposed to each other and with the magnetic layer located between them, thereby rotating the magnetic disc.

The magnets for orientation produces a magnetic field of about 1000 to 10000 G in the film, and may be provided in one to about six pairs. In this case, the magnets may be rotated at about 100 to 500 rpm for about 10 seconds to about 10 minutes. The atmosphere for orientation may or may not contain solvent vapor.

After orientation and if required, the coating material is dried, followed by a curing treatment for the curing of the magnetic coating material. The drying may occur at a temperature up to about 100° C.

When the binder is a thermosetting resin, various conditions inclusive heat-treatment temperature and time may be suitably determined with the type of the binder in mind, but the heat treatment may usually take place at about 150° to 300° C for about 1 to 5 hours. In the case of a radiation-curable resin, it may be treated at normal temperature in a dose of 3 to 10 Mrad. Preferably, the curing treatment takes place in an inert gas atmosphere, particularly in a nitrogen atmosphere. These make it possible to form a magnetic layer that is thin and uniform in thickness, and has a reduced surface roughness. For instance, it is preferable that the magnetic layer after the curing of the magnetic film is up to 0.6 $\mu$m, particularly up to 0.3 $\mu$m. In this case, it is preferable that the inner site is thicker than the outer site in view of reproduction output, overwriting properties, etc. The difference in thickness between the outer and inner sites is preferably 1% to 40% inclusive. The surface roughness Rmax may be reduced to 0.1 $\mu$m or below as well. These enable the polishing step to be considerably cut short, resulting in further improvements in mass productivity and productivity rate.

After the curing of the magnetic coating material, it is preferable that the magnetic layer is polished on the surface. The polishing may be carried out with the use of various polishing agents such as a polishing tape. This polishing permits the surface roughness of the magnetic layer to have a desired value, and enables the thickness of the magnetic layer to be regulated as well. In the invention, it is noted that since the Rmax after curing can be reduced, as mentioned above, the Rmax of the magnetic layer can be reduced by polishing to about 0.1 $\mu$m, particularly 0.02 $\mu$m, and a low of about 1 nm.

After the polishing of the magnetic layer, it is preferable that a liquid lubricant is coated on the surface of the magnetic layer for impregnation. While no particular limitation is placed on the liquid lubricant used, it is preferable to use a liquid lubricant containing a fluorine-containing organic compound because of its excellent lubricating properties. No particular limitation is placed on how to coat the liquid lubricant; it may be coated as by dipping or spin coating.

After the impregnation of the liquid lubricant, it is preferable that the surface smoothness of the magnetic disc is further improved by vanishing. It is noted that such a liquid lubricant may have been contained in the magnetic coating material.

EXAMPLES

The invention will now be explained at greater length with reference to some illustrative examples of the invention.

Example 1

A magnetic coating material was prepared as follows.

| | |
|---|---|
| Magnetic Powders | 100 parts by weight |
| Composition: α-Fe | |
| Coercive Force: 1190 | |
| Major Diameter: 0.25 μm | |
| Acicular Ratio: 8 | |
| α-Al$_2$O$_3$ | 10 parts by weight |
| Epoxy Resin | 28 parts by weight |
| (Epicoat 1004, Shell Chemical Co.) | |
| Phenolic Resin | 12 parts by weight |
| (Sumilac PC25, Sumitomo Bakelite Co.) | |
| Silicone Oil | 0.4 parts by weight |
| Cyclohexanone/Isophorone | 570 parts by weight |
| (1:1 mixture) | |

The above composition was mixed and dispersed together in a ball mill for 140 hours.

The coating material had a viscosity of 660 cps.

Then, a leveling device in which, as shown in FIG. 2, rod-like magnets with N and S poles opposed to each other are diagonally arranged is used to rotate the disc in an air atmosphere containing cyclohexanone vapor for film formation and magnetic field treatment at room temperature of 23° C.

For film formation, the coating material was coated on both sides of a 3.5-inch disc form of aluminum substrate, and then severed at 4000 rpm over 5 seconds. Subsequently, the film was leveled at 1000 rpm for 20 seconds. The magnet field was applied all the time throughout the film formation and leveling steps. The magnetic field strengths in the film are referred to in Table 1.

Then, the disc was oriented in the circumferential direction with an orienting device with opposite magnets built in it, followed by the drying of the coating material. The magnetic field for orientation was kept uniform at 3000 G throughout the coating material, and this treatment was done at 200 rpm for 45 seconds.

Then, the film was cured at 200° C. for 3 hours in a nitrogen stream, and was then polished by a polishing tape WA10000 (made by Nippon Micro-Coating Co.) with the use of a tape polishing device to the amount of polishing of about 0.01 μm, thereby smoothening the magnetic layer.

Then, the disc was washed, and then coated and impregnated with a 0.1% solution of fluorocarbon (KRITOX 143CZ; Du Pont) in flon by dipping to prepare a magnetic disc sample No. 1. The magnetic layer had a surface Rmax of 10 nm.

Sample No. 2 for comparison was prepared following the procedures of the example with the exception that the magnetic field treatment was carried out at the film formation and leveling steps with the use of a magnetic field-application device using magnets having varying magnetic field strengths. The magnetic field strengths in the film are referred to in Table 1.

Then, Sample No. 3 for comparison was prepared following the procedures of the example with the exception that no magnetic field treatment was done at the film formation and leveling steps.

Even at the film locations in these magnetic field-application devices, the magnetic field strengths, the film thicknesses of Sample Nos. 1–3, and the output and overwriting properties were measured at the inner (25-mm away from the disc center), middle (32-mm away) and outer sites (39mm-away) of the disc. The results are set out in Table 1.

TABLE 1

| Disk | Location | Magnetic Field Strength (G) | Thickness (μm) | Reproduction Output (mW) | O/W (dB) |
|---|---|---|---|---|---|
| Sample No. 1 | Inner | 1500 | 0.18 | 0.38 | −40.5 |
| (Invention) | Middle | 700 | 0.15 | 0.40 | −39.7 |
| | Outer | 400 | 0.14 | 0.45 | −38.2 |
| Sample No. 2 | Inner | 1050 | 0.12 | 0.25 | −42.5 |
| (for comparison) | Middle | 1100 | 0.15 | 0.40 | −39.7 |
| | Outer | 1100 | 0.15 | 0.48 | −37.2 |
| Sample No. 3 | Inner | 0 | 0.13 | 0.26 | −41.8 |
| (for comparison) | Middle | 0 | 0.15 | 0.41 | −38.5 |
| | Outer | 0 | 0.16 | 0.50 | −36.0 |

The magnetic layer thickness was found by pre-locating an inter-magnetic layer site in the disc to be measured and using a probe type of surface roughness measuring instrument diameter (Talystep) to measure a step from the film in situ. The reproduction output and overwriting properties were measured with the use a levitation type of magnetic head with a magnetic disc certifier. The magnetic head used for this measurement was a monolithic type of MIG head with a gap length of 0.6 μm, and the quantity of head levitation at the time of recording and reproduction was regulated to 0.14 μm. The reproduction output was the P-P value measured at a recording frequency of 3.3 MHz. It is noted that during the measurement the disc was rotated at 3600 rpm.

The overwriting properties (O/W) was estimated in terms of the quantity of attenuation of 1F signals when 2F signals (3.3 MHz) were overwritten onto the 1F signals (1.65 MHz), and this was measured by means of a spectrum analyzer (Hewlett-Packard Co.). From Table 1, the effect of the invention can be clearly understood.

EFFECT

With the process for fabricating a magnetic disc according to the invention, it is possible to form a magnetic layer that is uniform in thickness, or is thicker on the inner site and thinner on the outer site. This makes it possible to provide a coated type of magnetic disc in which there is a reduced difference in reproduction output and overwriting properties between the inner and outer sites.

What is claimed is

1. A magnetic disc including on a rigid substrate a magnetic layer obtained by forming a film of a coating material containing magnetic particles and a binder and orienting and curing the film, wherein:

said film is formed from a solvent dispersion by spin-coating while a magnetic field is applied thereto during film formation and levelling steps, said magnetic field being larger in strength on the inner side than on the outer side of said rigid substrate and wherein the magnetic layer is larger in thickness on the inner side of said substrate than on the outer side.

2. A magnetic disc according to claim 1, wherein the value obtained by dividing the magnetic field strength on said outer side by the magnetic field strength on said inner side is 1.1 or more.

3. A magnetic disc according to claim 1, wherein after said curing, polishing is carried out.

4. A magnetic disc according to claim 3, wherein a difference in thickness between the outer and inner sites of said magnetic 5. A magnetic disc according to claim 1, wherein said magnetic layer is 0.6 μm or below in thickness.

6. A magnetic disc according to claim 5, wherein said magnetic layer has a surface roughness Rmax of 0.1 μm or below.

* * * * *